United States Patent [19]

Keller

[11] Patent Number: 4,925,005
[45] Date of Patent: May 15, 1990

[54] ACCUMULATING CONVEYOR

[75] Inventor: Daniel H. Keller, Sanford, Fla.

[73] Assignee: Simplimatic Engineering Company, Lynchburg, Va.

[21] Appl. No.: 257,221

[22] Filed: Oct. 13, 1988

[51] Int. Cl.$^5$ .................................................... B65G 47/26
[52] U.S. Cl. ................................ 198/460; 198/463.6; 198/634
[58] Field of Search .................. 198/419.1, 460, 463.6, 198/634, 718, 751, 810

[56] References Cited

U.S. PATENT DOCUMENTS

| | | | |
|---|---|---|---|
| 3,164,246 | 1/1965 | De Good | 198/160 |
| 3,206,008 | 9/1965 | Bowman et al. | 198/160 |
| 3,225,893 | 12/1965 | Currie | 198/127 |
| 3,251,452 | 5/1966 | Conway et al. | 198/34 |
| 3,253,697 | 5/1966 | De Good et al. | 198/127 |
| 3,322,259 | 5/1967 | Milazzo | 198/219 |
| 3,355,008 | 11/1967 | Milazzo | 198/219 |
| 3,499,524 | 3/1970 | Milazzo | 198/221 |
| 3,718,248 | 2/1973 | Muller | 198/127 |
| 3,730,330 | 5/1973 | De Good | 198/127 |
| 3,930,573 | 1/1976 | Wyman | 198/37 |
| 3,934,707 | 1/1976 | Bowman | 198/34 |
| 4,042,101 | 8/1977 | Krammer et al. | 198/460 |
| 4,109,783 | 8/1978 | Vogt | 198/781 |
| 4,120,393 | 10/1978 | Motooka et al. | 198/460 |
| 4,266,659 | 5/1981 | Meyer et al. | 198/781 |
| 4,362,238 | 12/1982 | Rivette | 198/781 |
| 4,453,627 | 6/1984 | Wilkins | 198/781 |
| 4,533,055 | 8/1985 | Haney | 211/70.4 |
| 4,534,462 | 8/1985 | Hoover et al. | 198/781 |
| 4,609,098 | 9/1986 | Morgan et al. | 198/781 |
| 4,721,203 | 1/1988 | Kimball et al. | 198/781 |

FOREIGN PATENT DOCUMENTS

| | | | |
|---|---|---|---|
| 2112728 | 7/1983 | United Kingdom | 198/460 |
| 2189760 | 11/1987 | United Kingdom | 198/460 |

Primary Examiner—Joseph E. Valenza
Attorney, Agent, or Firm—St. Onge Steward Johnston & Reens

[57] ABSTRACT

An accumulating conveyor is provided having a plurality of zones between opposite ends of the conveyor. The conveyor has a continuously operable conveying surface extending through the zones for engaging articles on the conveyor to propel the articles through the zones along a conveyor path from a generally upstream to a generally downstream position in either a first direction towards a selected one of the ends or a second direction opposite the first direction towards the opposite end. The conveyor can select in which direction the conveyor surface is to propel articles. A plurality of cam operated lifting platforms lifts the articles from the conveyor surface to halt the progress of the articles along the conveyor, and sensors in each zone sense the presence or absence of articles.

39 Claims, 9 Drawing Sheets

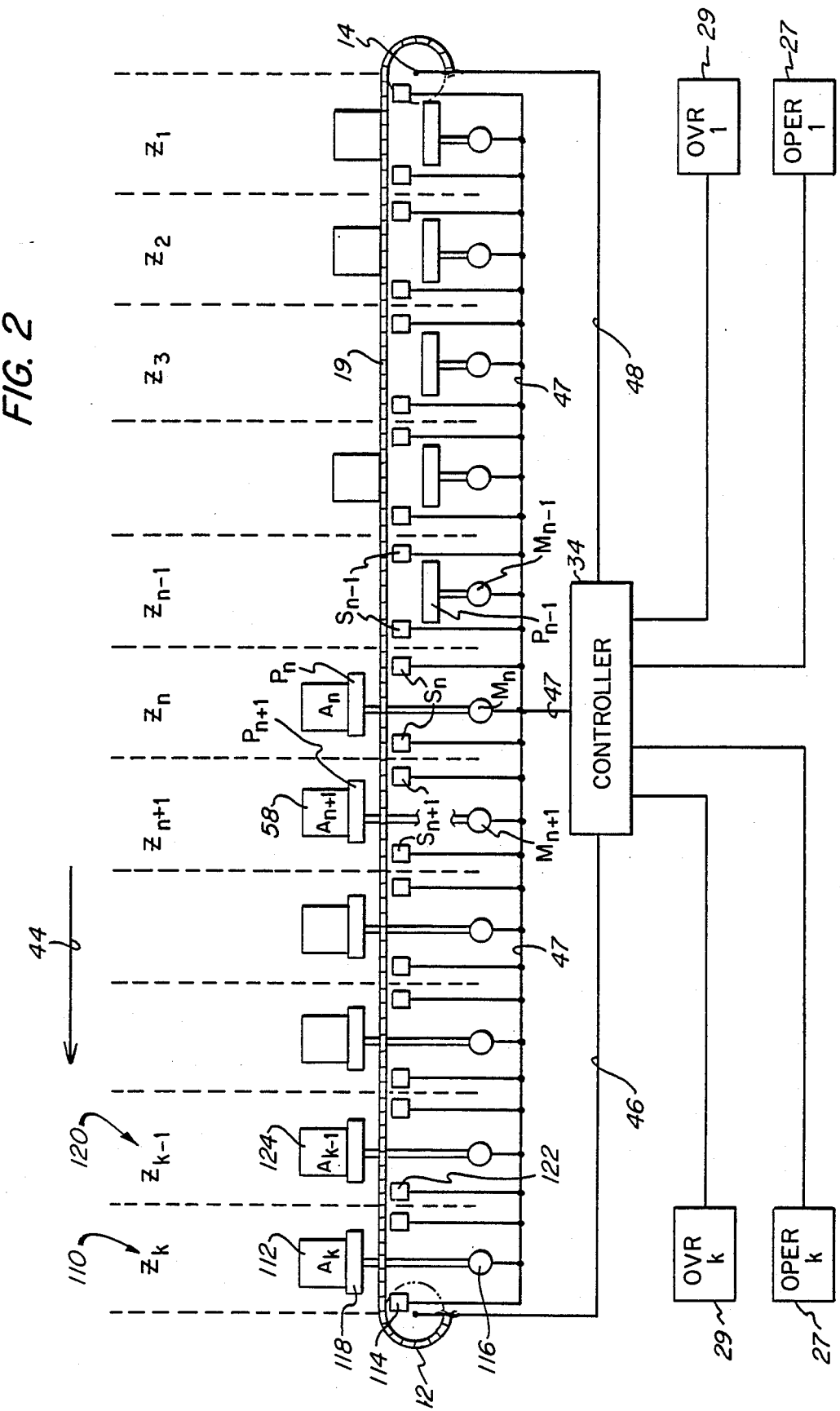

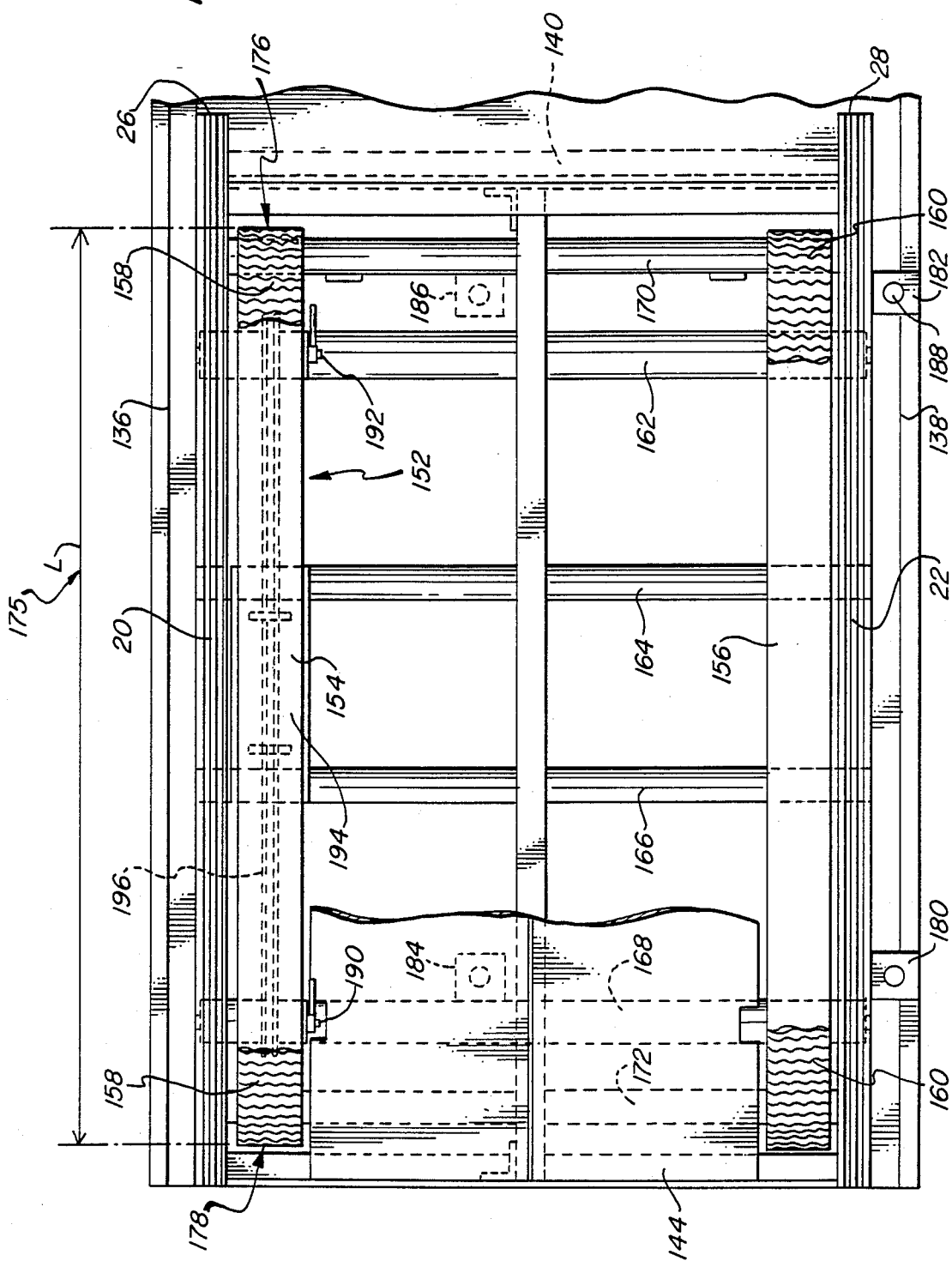

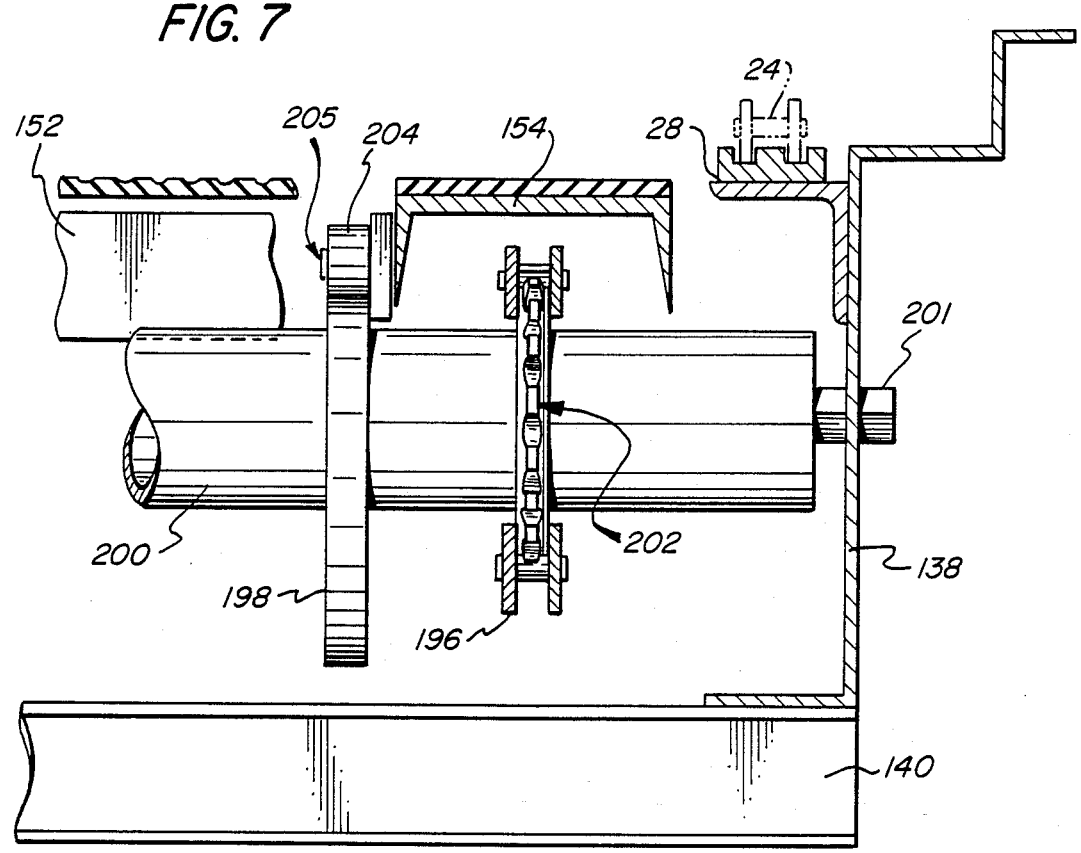
FIG. 7
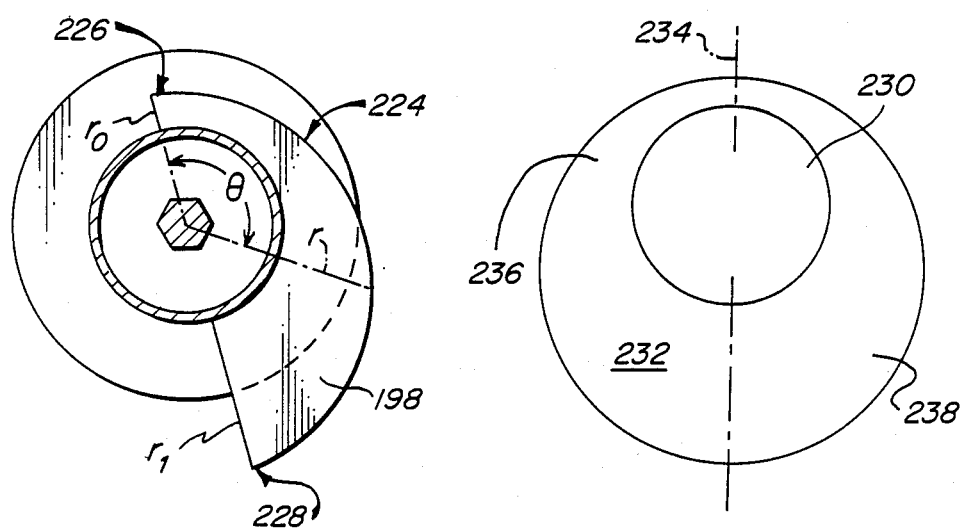
FIG. 8
FIG. 8A

ACCUMULATING CONVEYOR

FIELD OF THE INVENTION

The present invention relates to accumulating conveyors. More specifically, an accumulating conveyor is provided for accumulating relatively heavy articles such as pallets in both forward and reverse directions by using a series of cam actuated lifting platforms disposed along the conveyor path for lifting pallets to be accumulated from a driving chain in a controlled fashion.

BACKGROUND OF THE INVENTION

Conveyors for accumulating articles and thereafter discharging said articles in a controlled fashion are known in the art. For example, U.S. Pat. No. 4,120,393 to Motooka et al. and U.S. Pat. No. 3,934,707 to Bowman both show devices for accumulating articles on a conveyor by blocking or lifting these articles from the conveying surface. The Motooka et al. and Bowman references are said to be particularly useful for relatively soft and flexible articles, such as those packed in plastic or metal foil wrappers or articles with insufficient or weakened bottom areas. U.S. Pat. No. 3,251,451 to Conway et al. also shows the concept of lifting an article from a conveyor to temporarily halt its progress.

U.S. Pat. No. 3,930,573 to Wyman describes a drive chain that can be raised to drive or lowered to cease driving selected pallets disposed along a conveyor to thereby provide accumulating ability.

Accumulating conveyors are also known for selectively activating and deactivating groups of rollers in variously defined zones to provide the accumulating function. See, e.g., U.S. Pat. Nos. 4,042,101 to Krammer et al.; 4,266,659 to Meyer et al.; 4,362,238 to Rivette; 4,453,627 to Wilkins; and 4,534,462 to Hoover et al. For example, U.S. Pat. No. 3,718,248 to Muller shows an accumulation roller conveyor in which the direction of article movement is reversible.

SUMMARY OF THE PRESENT INVENTION

In accordance with the preferred embodiment of the present invention, an accumulating conveyor is provided that is particularly useful for accumulating relatively heavy articles such as pallets. The operator can determine whether the conveyor will accumulate such articles in either a forward or reverse mode, such as for example either in a left to right direction or vice versa. A plurality of zones are defined between opposite ends of the conveyor, and an endless driving member such as a chain or chains passes through said zones to propel articles along the conveyor path in a chosen direction, either forward or reverse. A series of platforms is disposed along said path, there being one platform per zone. A dual cam wheel-follower combination for each platform is activated by a pneumatic cylinder and a pneumatic control system to lift the platform with appropriate timing established by a pneumatic control system and thereby halt an article in that zone. The cam wheel has a shaped edge for lifting articles in a particularly smooth and stable manner. Once a control system begins the accumulation of articles at either one end or the other end of the conveyor, the platforms are activated in successive upstream zones to accumulate articles as they are sensed therein.

Further in accordance with the particularly preferred embodiment, the dual cam wheel-follower combination uses a cam wheel having a shaped edge defining upward displacement H of the platform as a function of an angular displacement $\theta$ of said cam about an axis of rotation.

Also provided in accordance with the present invention is a method of controlling the operation of an accumulating conveyor having a plurality of zones between opposite ends of the conveyor, each zone including at least one selectively operable means for displacing an article out of engagement with an article driving means, the method comprising the steps of operating the displacing means of either endmost zone to cause any article sensed in said endmost zone to be halted; sensing the presence or absence of articles in each zone between said endmost zones; and operating the displacing means of each of said zones between said endmost zones to cause any article sensed in said zone to be halted only when an adjacent downstream zone, which can be in either a first or second direction depending upon the direction of conveyor movement, has an article halted therein.

It is an object of the present invention to provide a method of and apparatus for accumulating relatively heavy articles on a conveyor and subsequently discharging accumulated articles in either a forward or a reverse mode.

It is a further object of the present invention to provide an accumulating conveyor that is particularly well suited to accumulate relatively heavy loaded pallets.

It is a further object of the present invention to provide an accumulating conveyor that has a lifting action to disengage articles from a driving means, said lifting action to be relatively smooth to provide suitable stability for relatively heavy loads.

Further objects and advantages of the present invention will become apparent from the following description of the drawings and the preferred embodiments.

BRIEF DESCRIPTION OF THE DRAWINGS

FIG. 2 is a schematic diagram of the conveyor of FIG. 1A accumulating in a second or reverse mode;

FIG. 3 is a top view of one of the platforms of the accumulating conveyor of the present invention;

FIG. 7 is an end view with partial cutaway of the cam wheel-follower combination of FIGS. 5 and 6;

FIGS. 8 and 8A are side views of the cam wheel of the present invention; and

DETAILED DESCRIPTION OF THE PREFERRED EMBODIMENT

Figure 1:
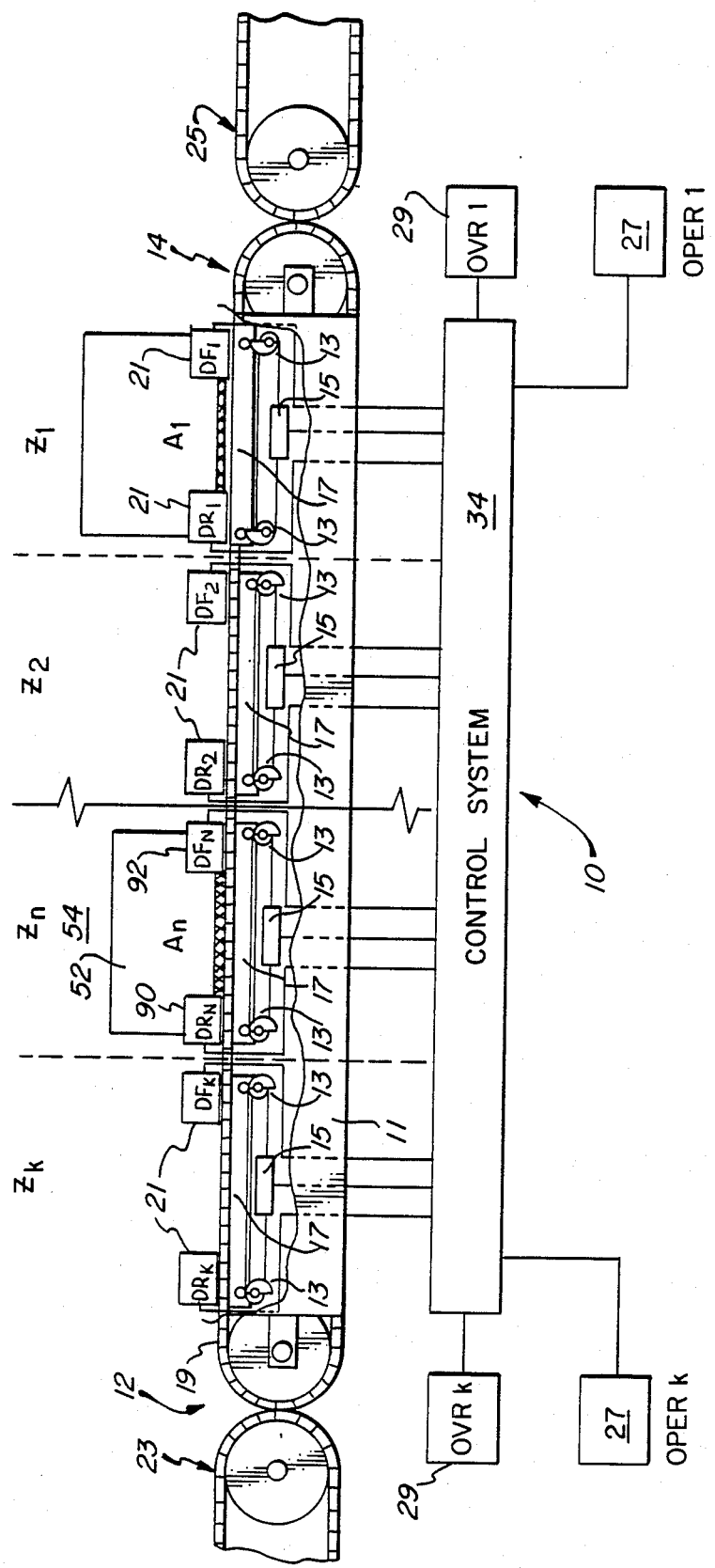
FIG. 1 is a schematic representation of the preferred embodiment of the accumulating conveyor of the present invention.

FIG. 1 shows the accumulating conveyor 10 of the present invention. Conveyor base 11 has been partially broken away to show cam wheel pairs 13, which are operated by double acting pneumatic cylinders 15 to raise and lower platforms 17 under the direction of control system 34 in response to article detector pairs 21. By lifting articles from the driving surface such as chain 19, such articles are halted and with the proper platform timing can thereby be accumulated. Conveyor 10 receives articles from and/or conveys articles to companion conveyors 23 and 25, depending upon whether conveyor 10 is running in the forward or the reverse mode as determined by an OPER selector 27, there being an $OPER_1$ selector for end 14 of the conveyor and an $OPER_k$ selector for conveyor end 12, the "k" indicating the kth or last zone, with k being any integer indicating the total number of zones. The OPER selectors are connected to controller 34 by suitabe control lines.

It is understood that conveyors 23 and 25 can be replaced by any source and/or receiving area for pallets, such as for example forktrucks or transfer cars.

Conveyor 10 can be conveniently thought of as being divided into zones $Z_1, Z_2, \ldots Z_n, \ldots Z_k$ as shown in FIG. 1, where there are k number of zones and $Z_n$ is the general expression for any one of the k zones. $A_n$ is therefore the general expression for an article in zone $Z_n$ at any moment in time.

Selectors $OVR_1$ and $OVR_k$ indicated generally at 29 are connected to controller 34 by suitable control lines and provide an operator with control capability for accumulation and/or discharge of articles at either end of the conveyor, as described more fully in detail below.

Figure 1A:
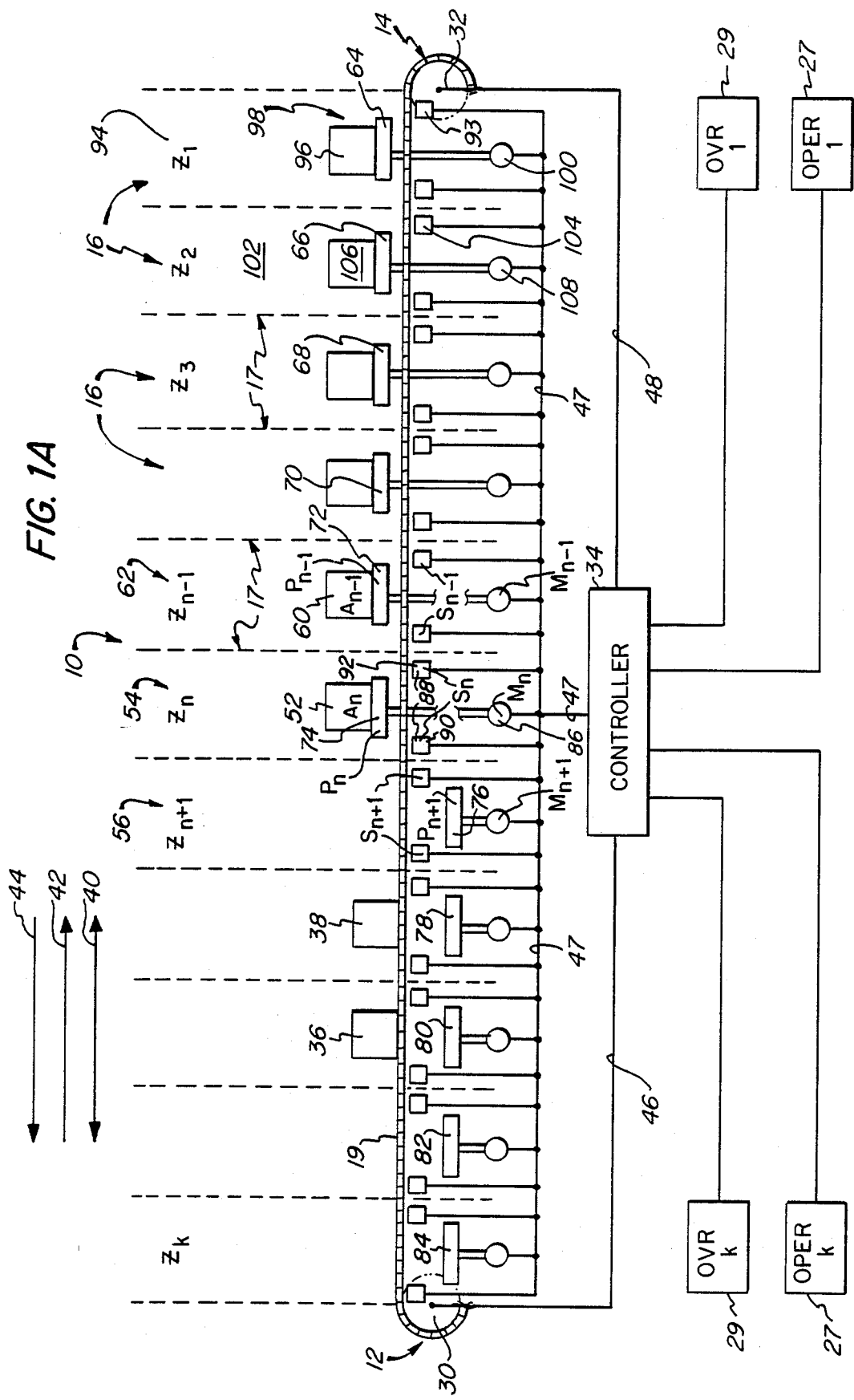
FIG. 1A is an expanded schematic diagram of the accumulating conveyor of FIG. 1 accumulating in a first or forward mode.

As shown in the expanded schematic view of FIG. 1A, the preferred embodiment of the accumulating conveyor 10 of the present invention has opposing ends 12 and 14 with a plurality of zones $Z_1, Z_2, Z_3 \ldots Z_{n-1}, Z_n, Z_{n+1}, \ldots, Z_k$ indicated generally at 16 therebetween with broken lines 17 separating adjacent zones, wherein k can be any integer indicating the chosen number of zones. Conveyor 10 has a continuously operable drive means such as chain 19, which in the preferred embodiment comprises a pair of conventional endless conveyor chain runs 20 and 22 as shown in FIG. 3. A single chain of the pair is also indicated at 24 in the phantom side view in FIG. 7. The return portion of chain 19 is removed in FIGS. 1A-2A to more clearly show additional structural details as discussed below. Chain 19 is moved along chain guides 26 and 28 (see FIGS. 3 and 7) by routine motor means such as indicated at 30 and 32, which are under the direction of controller 34 through control lines 46 and 48. Chain 19 is disposed for engaging the bottoms of articles or pallets such as articles 36 and 38 to propel said articles through the zones $Z_1, \ldots, Z_k$ along a conveyor path indicated generally by bi-directional arrow 40. Conveyor 10 can propel articles such as articles 36 and 38 in either a first direction towards end 14 as indicated by arrow 42 or in a second, opposite, direction towards end 12 as indicated by arrow 44. It is understood that the terms "first direction" and "second direction" as well as similar terms like "forward" and "reverse" or "left" and "right" are used here solely for convenience of description. The terms "upstream" and "downstream" are relative; that is, regardless of whether the conveyor is being operated in the forward or reverse mode, any articles on the conveyor will tend to move "downstream" from a more "upstream" position.

Controller 34 controls motors 30 and 32 through suitable control lines 46 and 48, and controller 34 includes routine means for responding to operator inputs through $OPER_1$ and $OPER_k$ to select in which direction conveyor 10 is to be driven by motors 30 and 32.

Figure 2A:
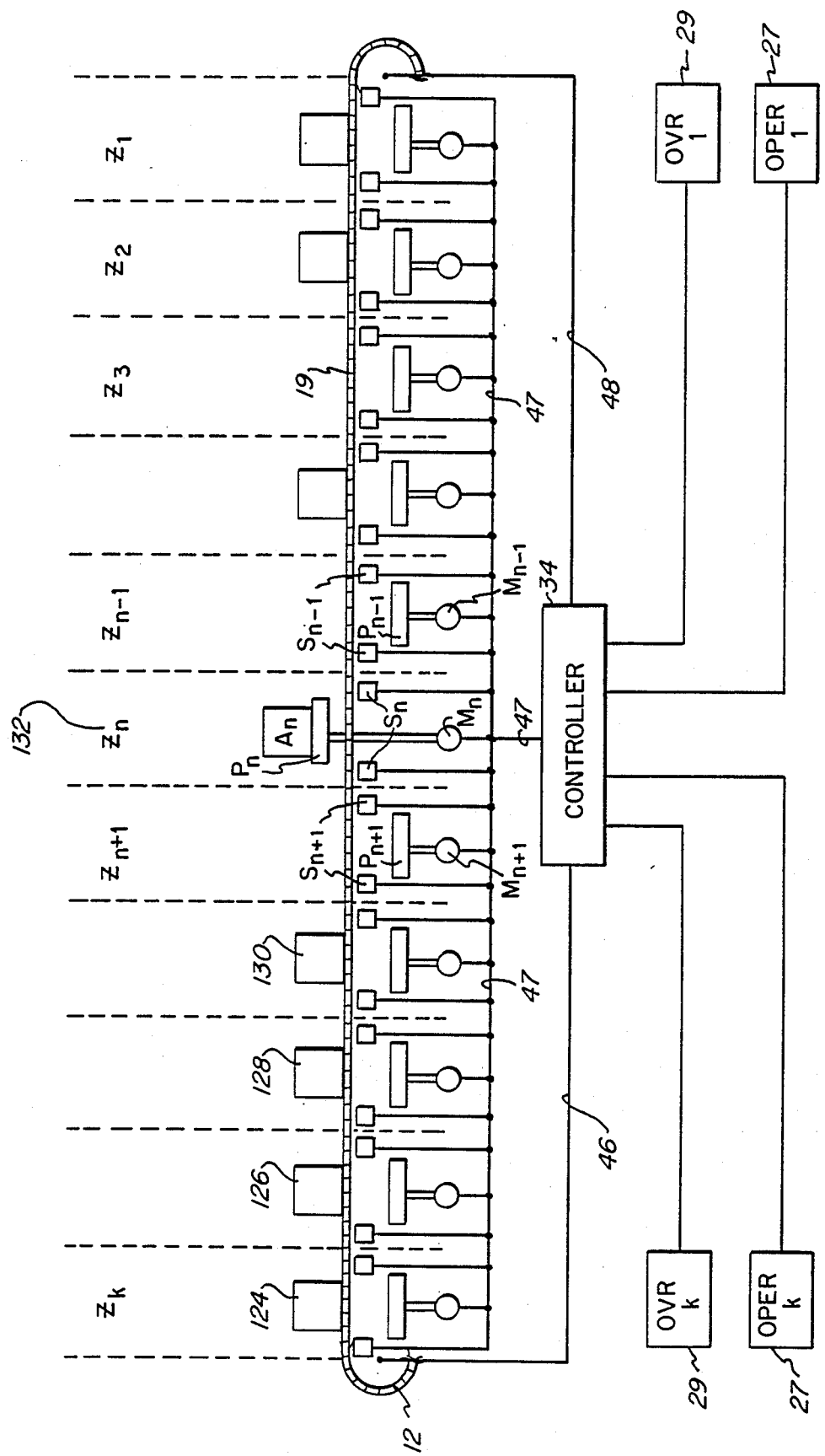
FIG. 2A is a schematic diagram of the conveyor of FIG. 2 discharging articles in the reverse mode.

Articles such as articles 36 and 38 are driven along path 40 of conveyor 10 and are typically pallet-loaded articles having a weight in the range of approximately 50–6,000 pounds each. Although the conveyor 10 of the present invention is designed to accommodate heavy loads, it is understood that lighter articles could be accumulated as well so long as the size of each article was appropriate for interaction with the sensors and the platforms to be described in more detail below. The term $A_n$ shown at 52 in FIG. 1A and as used in FIGS. 2 and 2A is used to describe the article in any zone $Z_n$ shown at 54 at any given time; $A_{n+1}$ describes any article in adjacent zone $Z_{n+1}$ at 56 at any given time; $A_{n-1}$ at 60 describes any article in the other adjacent zone $Z_{n-1}$ at 62, and so on. It is understood that the subscript "n" is used generically to indicate a zone, article, platform, or sensor. The subscripts "n+1" and "n−1" are used generically to indicate adjacent zones, articles, platforms, or sensors in either the first or second directions as indicated in FIGS. 1A, 2, and 2A.

The platforms $P_1, P_2, P_3, \ldots P_{n-1}, P_n, P_{n+1}, P_k$ indicated at 64, 66, 68, 70, 72, 74, 76, 78, 80, 82, and 84 respectively provide means for disengaging articles from chain 19 by lifting articles away from chain 19, therefore halting such an article's progress. For example, in FIG. 1A articles $A_n$ at 52 and $A_{n-1}$ at 60 have been lifted from chain 19 by platforms $P_n$ at 74 and $P_{n-1}$ at 72 respectively shown in a raised position. By contrast, articles 36 and 38 have not been lifted, as platforms 78 and 80 are in a lowered position. A more detailed description of the platforms $P_n$ will be provided below with reference to FIG. 3. Platforms $P_n$ are operable by associated means $M_n$ shown generally at 86 for activating or lifting platforms $P_n$. In the preferred embodiment, pneumatic actuator means or cylinders are used under the direction of controller 34 through trunk line 47 and are described in more detail below with reference to FIGS. 4–7. Trunk 47 of course contains a number of separate control lines and is shown for simplicity's sake as a single line in FIGS. 1A, 2, and 2A. The cylinders act upon cam wheel-follower combinations under the direction of controller 34 through the pneumatic control circuit described in FIG. 9. It is understood that the control circuit is not limited to pneumatic or air logic devices, but could be any suitable control system such as for example an electrical or electronic system.

There is one platform $P_n$ associated with each zone $Z_n$, such that the progress of an article $A_n$ can be halted in that zone $Z_n$ from proceeding further in the direction of travel of chain 19, be it forward or reverse.

Routine sensor devices, such as for example mechanical trip levers operatively connected to pneumatic limit valves, provide means $S_n$ associated with each zone $Z_n$ for sensing the presence or absence of articles $A_n$ within the zone $Z_n$ of each sensing means $S_n$. Each sensor $S_1, S_2, S_3, \ldots, S_{n-1}, S_n, S_{n+1}, \ldots, S_k$ preferably includes a detector pair of routine detectors. These sensors are shown only conceptually in FIGS. 1A, 2, and 2A. With reference to the further detail of FIG. 1, it is seen that each sensor includes a pair of detectors, with $DF_n$ indicating the detector towards one end such as the front and $DR_n$ the other detector towards the other end such as the rear of a zone $Z_n$. For example, zone $Z_n$ at 54 shows $S_n$ at 88 as comprising two detectors 90 and 92, detector 90 being $DR_n$ for the "rear" and detector 92 being $DF_n$ for the "front" of zone $Z_n$ as seen in more detail in FIG. 1. Detectors 90 and 92 provide signals that the leading edge of an article is present in either the front or rear portion of their associated zone. In the preferred embodiment, the signal is pneumatic and the detectors are routine devices operating routine limit valves, although the signal could be electrical or optical for a different system. As described below, the closing of a limit valve and the subsequent air flow therethrough will provide an air pressure signal indication of the presence of an article, while the opening of a limit valve and the cessation of air flow therethrough and the absence of an air pressure signal will indicate the absence of an article. Sensors $S_n$ communicate with controller 34 through trunk 47. The sensors $S_n$ are shown below chain 19 in FIGS. 1A, 2, and 2A for convenience only, the exact vertical position of the sensors $S_n$ being unimportant for the purposes of this invention.

The controller 34, which includes an air logic system as described more fully below with respect to FIG. 9, controls the activating means $M_n$, such as the pneumatic cylinders and associated cam wheels described below with reference to FIGS. 4-8, to lift and lower platforms $P_n$ in accordance with the following protocol. When the accumulating conveyor 10 is in the "forward" mode indicated by arrow 42 in FIG. 1A, the operator may make a decision to begin accumulating articles at end 14. In response to an appropriate input to controller 34 from $OVR_1$ and $OPER_1$, zone $Z_1$ at 94 and detector $DF_1$ at 93 are enabled. When article 96 has proceeded along conveyor 10 in the direction of arrow 42 and starts to pass through zone $Z_1$, detector $DF_1$ will detect the leading edge 98 of article 96, which will now be called article $A_1$, because it is in zone $Z_1$. When $DF_1$ detects the presence of $A_1$, an air pressure signal is generated which through the operation of the air logic system embodied in controller 34 and results in the activation of cylinder $M_1$ at 100, which raises platform $P_1$ at 64 to lift article $A_1$ from chain 19 and thereby halt its progress. Thereafter, zone $Z_2$ at 102 and detector $DF_2$ at 104 are enabled by the air pressure signal generated by $DF_1$, such that when article $A_2$ at 106 appears in zone $Z_2$ and is detected by $DF_2$, platform $P_2$ at 66 is activated by cylinder 108 and lifted to halt article $A_2$. Accordingly, platforms $P_n$ are activated in successive zones upstream of any zone where an article has been halted as the presence of articles in said upstream zones is sensed.

The accumulating conveyor 10 of the present invention has the ability to accumulate articles in the reverse direction as well, as depicted in FIG. 2, where through appropriate operator inputs to controller 34 through $OVR_k$ and $OPER_k$ the conveyor chain 19 now propels articles toward end 12 and away from end 14. The same sequence of events as described above for FIG. 1A now takes place, except that this time accumulation begins in zone $Z_k$ at 110. When article $A_k$ at 112 is sensed by detector $DR_k$ at 114, $M_k$ at 116 is activated to raise platform $P_k$ at 118 and halt article $A_k$. Zone $Z_{k-1}$ at 120 and its detector $DR_{k-1}$ at 122 are thereby enabled to halt article $A_{k-1}$ at 124 when its presence is detected by $DR_{k-1}$. This process is carried out in successive zones upstream of $Z_{k-1}$ until all articles as they appear have been halted in successive upstream zones.

Articles that have been accumulated are discharged by the conveyor 10 in either direction as well, regardless of the direction in which they have been accumulated. For example, FIG. 2A depicts articles being discharged that were previously accumulated as shown and described in FIG. 2. By appropriate operator inputs to controller 34 through $OVR_k$ and $OPER_k$, articles can be discharged. For example, FIG. 2A depicts articles that were accumulated as shown in FIG. 2 being discharged toward end 12. Article 112 is not shown in FIG. 2A because it has already moved off of conveyor 10, article 124 is now in zone $Z_k$, and articles 126, 128, and 130 are in the three successive zones upstream of zone $Z_k$ and moving downstream.

The manner of lowering platforms for discharging of articles is discussed, by way of example only, with respect to zone $Z_n$ at 132 and article $A_n$ therein. When the adjacent downstream zone $Z_{n+1}$ is cleared of its article, sensor $S_{n+1}$ generates a signal that in accordance with control of controller 34 directs cylinder $M_n$ to be deactivatable to lower platform $P_n$ and replace halted article $A_n$ into engagement with chain 19. The platform $P_n$ is deactivatable in response to either a sensing means $S_{n+1}$ associated with said immediately adjacent zone $Z_{n+1}$ in one direction sensing the absence of an article, or if the discharging is to take place in the opposite direction, if the sensing means $S_{n-1}$ associated with the immediately adjacent zone in the other direction senses the absence of an article. That is, in the discharge mode, each activating means $M_n$ successively deactivates each disengaging means $P_n$ in successive zones upstream of any zone where an article has been halted and then replaced onto the driving chain 19.

The Conveyor Structure

The conveyor 10 itself includes a base indicated generally at 11 in FIG. 1 in a partial cutaway and in more detail in FIGS. 3-7, where the base weldment includes a pair of opposing side bodies 136 and 138 joined by cross members 140, 142, 144, 146, and 148. Base 11 can be any structure suitable for routine mounting on an appropriate support surface, such as for example a concrete floor or support legs, brackets, and/or hangers.

Mounted between side bodies 136 and 138 for vertical movement up and down between chains 20 and 22 is a platform or lifting frame, indicated generally at 152, which is formed from two longitudinally extending members 154 and 156 with treads 158 and 160 thereon. In FIG. 3, treads 158 and 160 have been partially cut away to reveal members 154 and 156 therebelow, which are joined by transverse members 170 and 172. Legs such as legs 174 and 176 join lower transverse members 170 and 172 to the upper transverse members and longitudinal members of the lifting frame 152. Transverse members 162, 164, 166, and 168 are part of the base.

Platform 152 has length L indicated at 175 between first and second ends 176 and 178 of platform 152, length L being chosen to support any articles to be lifted in a relatively stable manner. It is understood that the actual platform structure can be varied from the length L, so long as adequate support is provided for the articles to be lifted.

Detectors 180 and 182 can either be mounted as suitably chosen, such as for example on a side plate such as 138, or alternatively at 184 and 186 toward the center of platform 152 on cross members 168 and 170. Detectors 180 and 182 as a pair make up $S_n$ for each platform $P_n$ and zone $Z_n$. One detector 180 is mounted towards or adjacent end 178, while the other detector is mounted towards or adjacent end 176, thereby providing one "forward" detector $DF_n$ and one "reverse" detector $DR_n$ for each platform $P_n$. Detectors 180 and 182 can be any suitable transducers for detecting the presence or absence of an article, and in the preferred embodiment described herein include roller levers that operate pneumatic valves as described below. Accordingly, when an article $A_n$ being propelled along on chains 20 and 22 passes over platform 152 from end 178 towards end 176, detector 180 is disabled but detector 182 detects the presence of article $A_n$ when the leading edge of $A_n$ mechanically trips suitable member 188. The reaction time of controller 34 and pneumatic cylinder $M_n$ is such that, if zone $Z_n$ is enabled and ready to halt an article, platform 152 is lifted by $M_n$ quickly enough to lift article $A_n$ off the chains 20 and 22 and halt its progress. Replacing of the article $A_n$ on chains 20 and 22 occurs when controller 34 activates cylinder $M_n$ in the opposite direction causing $P_n$ to lower and return $A_n$ into contact with chains 20 and 22.

Also shown on FIG. 3 are top views of the cam wheel-follower combinations at 190 and 192, pneumatic cylinder 194 and pull chain 196, the operation of which will now be described further in detail below with respects to FIGS. 4 and 5.

Figure 4:
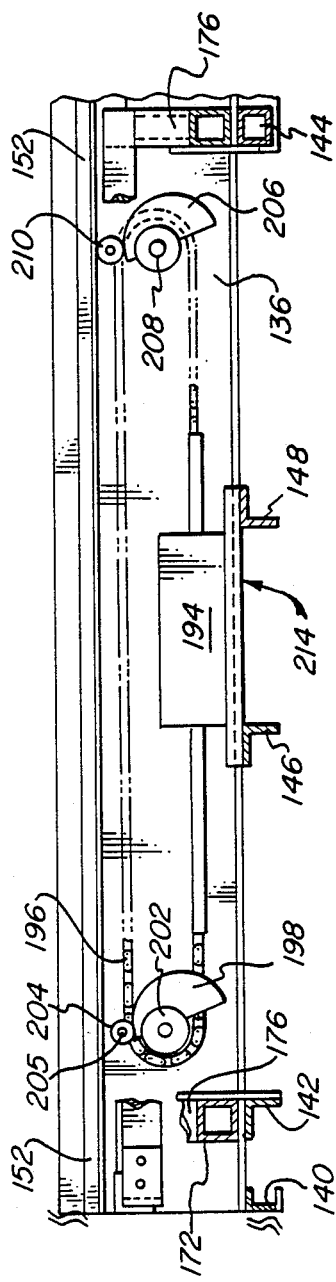
FIG. 4 is a side view of the dual cam wheel-follower mechanism for raising the platform of FIG. 3.

FIG. 4 shows the dual cam operated lifting mechanism of the present invention with part of platform 152 cut away to show the mechanism in more detail. FIG. 5 shows one cam wheel-follower combination in further detail in a lowered condition, FIG. 6 shows the same view but in a raised condition, and FIG. 7 shows further detail in a cross sectional view.

With reference now to FIGS. 4 and 7, cam wheel 198 is fixedly mounted such as by welding axially onto roller 200 which extends between side plates 138 and 136 and is fixedly mounted by axle bolt means 201 to plate 138. Toothed sprocket wheel 202 is likewise fixedly mounted axially on roller 200, such as by welding. Wheel follower 204 is rotatably mounted by bolt means 205 to longitudinal member 154 of platform 152 for reacting to rotation of cam wheel 198 to raise platform 152 in the direction indicated by arrow H.

A corresponding cam wheel 206, toothed sprocket wheel 208, and follower 210 is similarly mounted at the other end of platform 152.

Double acting pneumatic cylinder 194 is mounted on suitable support means 214 under platform 152 and approximately between cam wheels 198 and 206 and is operatively connected to a chain 196 that loops in a circuit around both sprocket wheels 202 and 208 with suitable routine adjusting and connecting links 220 and 222.

Figure 5:
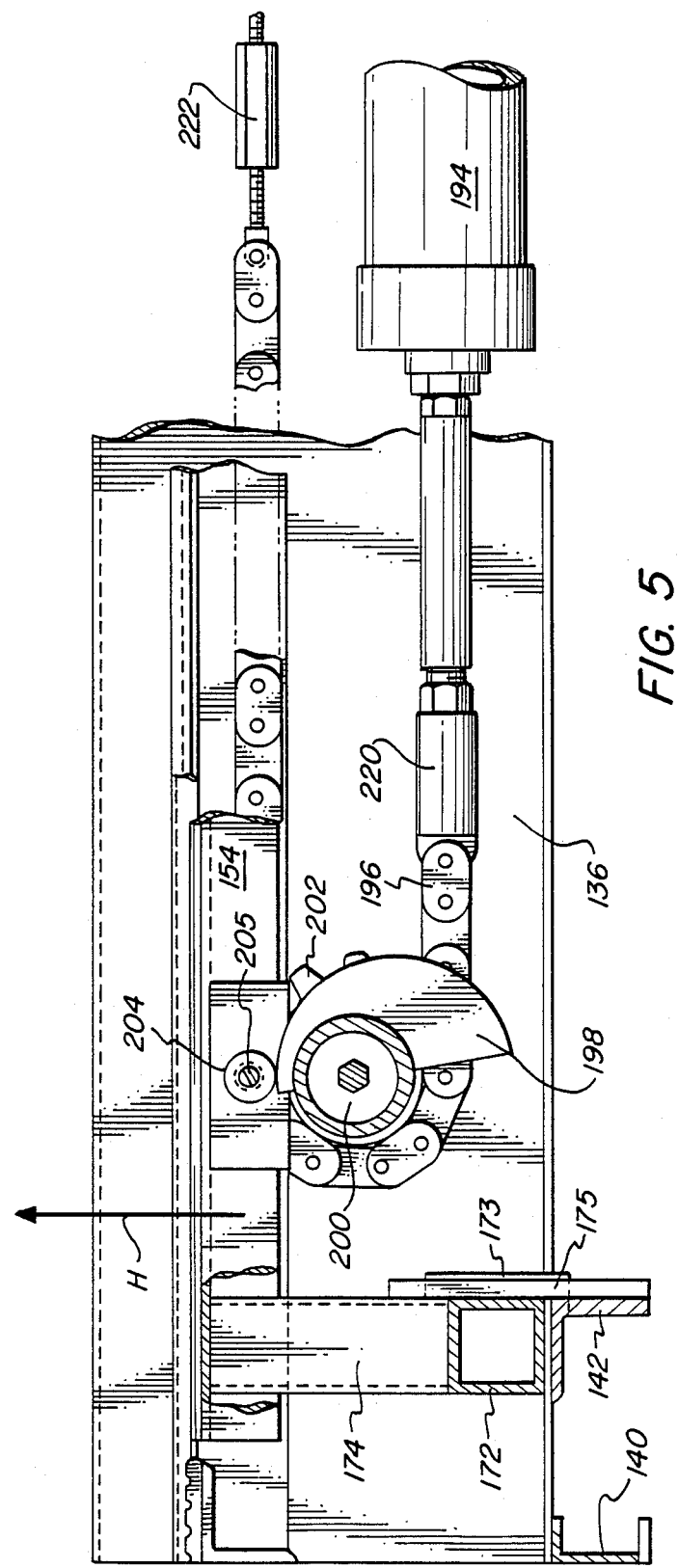
FIGS. 5 and 6 are partial side views with partial cutaway of one cam wheel-follower combination with the associated platform in the lowered and raised positions respectively.
Figure 6:
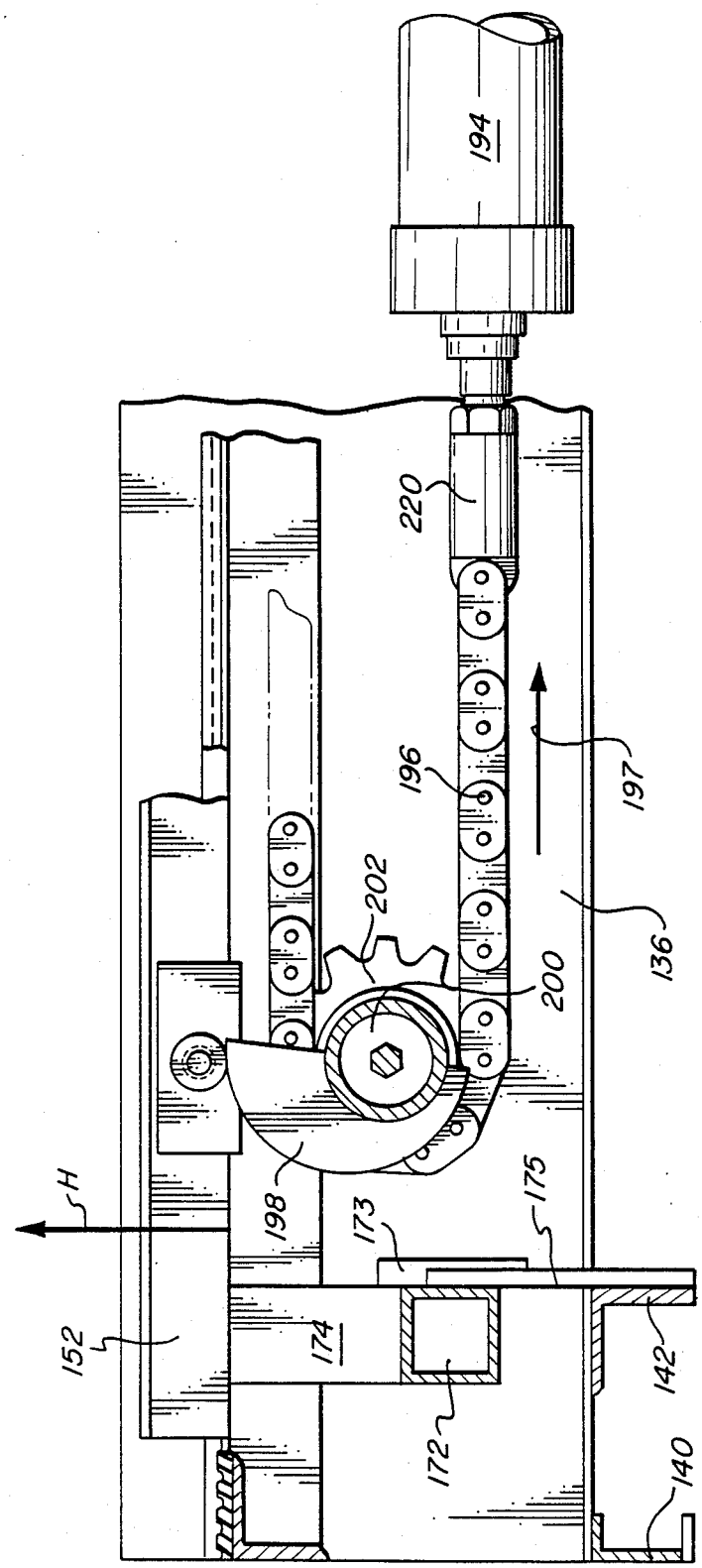

Accordingly, when cylinder 194 is activated to the left in FIG. 5, chain 196 and cams 198 and 206 are in the position shown in FIG. 5, and platform 152 is in the lowered position of FIG. 5. When an opposite air pressure is applied to cylinder 194 under direction of controller 34, cylinder 194 is activated to the right, and chain 196 is pulled to the left as shown by arrow 197 in FIG. 6, thereby rotating sprocket wheel 202, roller 200, and cam wheel 198 counterclockwise to lift platform 152 vertically as indicated by arrow H in FIG. 6. Once air pressure is applied in the opposite direction to cylinder 194, cam wheel 198 will be rotated in the opposite or lowering position—here clockwise—to return to the condition of FIG. 5.

The preferred shape of cam wheel 198 is shown in FIG. 8, where it is seen that wheel 198 has a shaped edge 224 with a radius that varies from $r_0$ at one point 226 on the edge to a radius $r_1$ at a second point 228 on the edge. Edge 224 is in effect generated by boring an aperture 230 in disc 232 on the centerline 234, but off center to achieve the camming action. Accordingly, $r_0$ corresponds to the desired lowered position and $r_1$ to the desired raised position of height H. Also as shown in FIG. 8A, the cam wheel 198 can be formed by drilling an appropriate offset bore 230 in disc 232 and then cutting the disc in half along center line 234 to form halves 236 and 238, comprising two cam wheels 236 and 238 to be welded to their respective rollers.

Also as shown in FIGS. 5 and 6, leg 172 has associated therein a slide member 173 that slidingly abuts a guide member 175 fixedly attached to crossmember 142. Members 173 and 175, as shown by the lowered and raised positions of FIGS. 5 and 6 respectively, cooperate to restrict platform 152 against moving with any horizontal component lifted by the cam action. Such restrictions are important to ensure stability of any articles being lowered or raised by platform 152.

The Pneumatic Control System and System Operation

Figure 9:
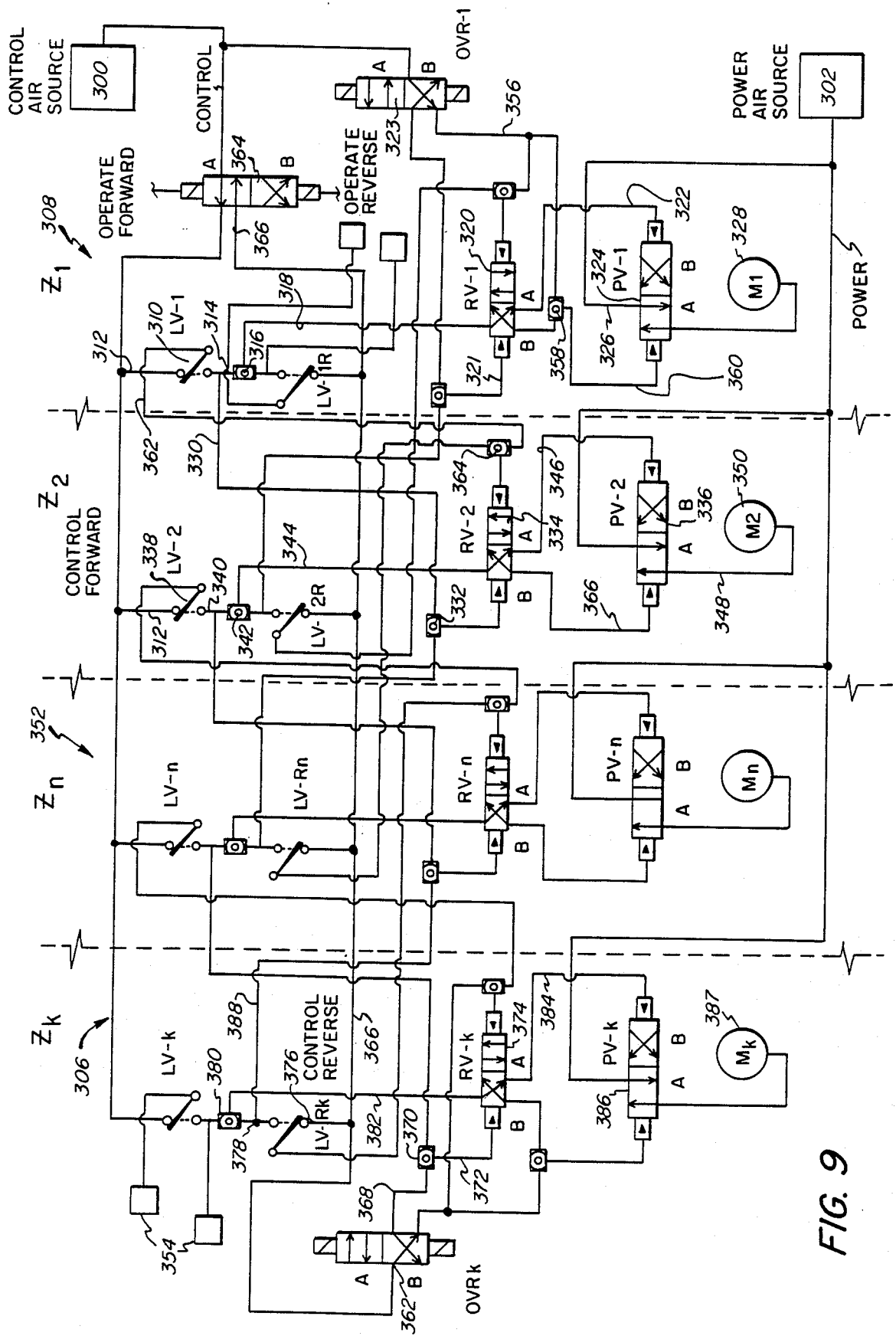
FIG. 9 is a schematic diagram of the pneumatic controller circuit for the preferred embodiment of FIG. 1.

The operation of the present invention is described with respect to the control system of FIG. 9. The OPER control at 364 is set to "forward" and $OVR_1$ at 323 is set to accumulate articles. FIG. 9 shows an OPER control 364 only at one end, but it is understood that this control can be duplicated at the other end as well. The system is therefore being operated in a "forward" or first direction, for accumulation of articles proceeding from left to right. Under initial conditions, control air source 300 is "on" and power air source 302 is "on". All the lifting frames $P_1$ through $P_k$ are lowered, and the detecting means $DF_1$ through $DF_k$ comprising limit valves LV-1 through LV-k are open, or non passing. Chain 19 is running from zone $Z_k$ towards zone $Z_1$.

During the filling or accumulating cycle, a pallet adjacent zone $Z_k$ at 306 advances onto conveyor 10 and proceeds downstream to the furthermost open zone 308, here $Z_1$. Detector $DF_1$ detects the presence of the pallet, and LV-1 at 310 closes. Control air passes from line 312 through valve LV-1 to line 314, through shuttle valve 316 for locking out any reverse signals, then to line 318 to relay valve RV-1 at 320, which has been initialized by admission of control air to line 321 by override valve OVR1 at 323 having been set by the operator to position "A", to be set in position B and let control air pass therethrough to line 322, thereby operating power valve PV-1 at 324 to position B. Power air on line 326 from power air source 302 is thereby admitted to cylinder $M_1$ at 328, which raises platform $P_1$ to stop the pallet and fill zone $Z_1$.

In addition to activating $M_1$, limit valve LV-1 at 310 also enables the next upstream zone $Z_2$ by transmitting control air on line 330 through shuttle valve 332 to set relay valve RV-2 at 334 to position "B", which will now allow control air to pass through to power valve PV-2 at 336 when control air becomes available through LV-2 at 338. In this fashion, zone $Z_2$ has been enabled or armed by zone $Z_1$'s having halted an article.

When the next article travels down conveyor 10, this article will proceed no further than zone $Z_2$, because LV-2 at 338 will be tripped to send control air from line 312 on line 340, through shuttle valve 342, then line 344, then RV-2 at 334, then line 346 to shift PV-2 at 336 to position "B" and through line 348 to activate cylinder $M_2$ at 350 to raise platform $P_2$ and halt the article.

This process continues successively upstream for each zone $Z_n$ at 352, which has its own LV-n, RV-n, PV-n, $M_n$, and $P_n$ until the last zone $Z_k$ at 306 is filled. At this point, a warning light or lockout device may stop the supplying of further pallets to the conveyor, which is now full and can accept no more pallets for accumulation until at least one zone is emptied.

To unload or discharge the pallets in this forward direction, the operator will issue a signal requiring a pallet to now advance off of the conveyor 10 into a receiving area adjacent zone $Z_1$, such as a transfer car (not shown). Such a signal is issued by shifting override valve $OVR_1$ at 323 to position "B", thereby sending control air through line 356, and shuttle valve 358, and line 360 to shift PV-1 to position "A", thereby venting $M_1$ and permitting $P_1$ to lower and replace article $A_1$ in engagement with chain 19. It is to be noted that RV-1 is also reset thereby to position "A", such that control air cannot be further delivered to PV-1 to shift PV-1 to position "B" when LV-1 is repeatedly opened and closed as pallets pass thereover to be discharged. RV-1 will remain in this unenabled position until either $OVR_1$ is returned to position A, or zone $Z_1$ is armed by zone $Z_2$ when articles are being accumulated the reverse direction.

When pallet or article $A_1$ is substantially completely off zone $Z_1$, LV-1 opens and control air now passes on line 362 through shuttle valve 364 to set RV-2 to position A and send control air on line 366 to move PV-2 to position A and vent cylinder $M_2$. This process continues upstream until all desired accumulated pallets have been off loaded through the downstream empty zones one at a time. This procedure will continue until conveyor 10 is empty. The conveyor likewise has the capacity of emptying or filling at the same time.

Accumulation and discharge of articles in either direction is controlled by override valves $OVR_1$ and $OVR_k$ at each end of the conveyor 10. There can also be selector switches $OPER_1$ and $OPER_k$ at either end of conveyor 10 for selecting either forward or reverse modes.

Accumulation of articles in the reverse direction proceeds in the same manner, except that in general detectors $DR_n$ are used to activate reverse limit valves LVR-n. For example, override valve $OVR_k$ at 362 is set to position A and operator valve 364 is set to position B, thereby introducing control air to line 366 through $OVR_k$ to line 368, then through shuttle valve 370 and line 372 to set valve RV-k at 374 to position B. When an article trips LVR-k at 376, control air passes through line 378, shuttle valve 380 and line 382 through RV-k and line 384 to set PV-k at 386 to position B, thereby activating $M_k$ at 387. The tripping of LVR-k also sends control air on line 388 to arm or enable the next upstream zone, and so on. Discharge of articles takes place by moving $OVR_k$ to position B, just as described above for the forward direction.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. An accumulating conveyor having a plurality of zones between opposite ends of said conveyor, said conveyor having continuously operable drive means extending through said zones for engaging articles on said conveyor to propel said articles through said zones along a conveyor path from a generally upstream to a generally downstream position in either a first direction towards a selected one of said ends or a second direction opposite said first direction towards said opposite end, said conveyor comprising:
   (a) means for selecting in which direction said drive means is to propel articles;
   (b) a plurality of selectively operable means for disengaging said articles from said drive means to halt the progress of said articles along said conveyor in the direction of said drive means, there being at least one such disengaging means associated with each zone;
   (c) means associated with each zone for sensing the presence or absence of an article within said zone of each sensing means;
   (d) means for activating said disengaging means to halt an article in response to both said article being sensed by said sensing means associated with said zone and also another article being halted in an immediately downstream adjacent zone, said activating means being responsive to said selecting means to determine in which direction articles will be accumulated.

2. The accumulating conveyor of claim 1, where said activating means is for successively activating said disengaging means in successive zones upstream of any zone where an article has been halted as the presence of articles in said upstream zones is sensed.

3. The accumulating conveyor of claim 2, wherein said activating means is further deactivatable to permit said disengaging means to replace a halted article into engagement with said drive means in response to either sensing means associated with said immediately adjacent downstream zone in said first direction sensing the absence of another article if articles are to be discharged in said first direction, or a sensing means associated with said immediately adjacent downstream zone in said second direction sensing the absence of another article if articles are to be discharged in said second direction, whereby any accumulated articles are discharged in said first or second direction, said activating means being responsive to said selecting means to determine whether articles will be discharged in said first or said second direction.

4. The accumulating conveyor of claim 3, where said activating means is for successively deactivating said disengaging means in said successive zones upstream of any zone where an article has been halted and then replaced.

5. The accumulating conveyor of either claim 1 or claim 3, wherein said zone means has an end and an opposite end, said ends lying generally along said conveyor path, and said sensing means comprises at least two means for detecting the presence or absence of an article, one of said detecting means being mounted adjacent said end of said zone and the other of said detecting means being mounted adjacent the opposite end of said zone, said first detecting means for detecting the presence or absence of articles in its associated zone when said drive means is propelling articles in said first direction, and said other detecting means for detecting the presence or absence of articles in its associated zone when said drive means is propelling articles in said second direction.

6. The accumulating conveyor of claim 5, wherein said activating means is responsive for articles being propelled in either direction to an article being halted in an immediately downstream zone.

7. The accumulating conveyor of claim 6, wherein said activating means is responsive to a fluid pressure source enabled by said detecting means.

8. The accumulating conveyor of claim 7, comprising a plurality of zones $Z_n$, a corresponding plurality of means for sensing $S_n$ the presence or absence of an article $A_n$ in said associated zone $Z_n$, a plurality $M_n$ of means for activating an associated one of said disengaging means $P_n$ to halt article $A_n$ in zone $Z_n$, and means responsive to $S_n$ and either $S_{n+1}$ or $S_{n-1}$ depending upon the direction of said drive means, to activate $M_n$ when $S_n$ has sensed the presence of an article in zone $Z_n$, either $S_{n+1}$ or $S_{n-1}$ has sensed the presence of either $A_{n+1}$ or $A_{n-1}$ respectively in zone $Z_{n+1}$ or $Z_{n-1}$ depending upon the direction of said drive means, and either $P_{n+1}$ or $P_{n-1}$ respectively has been activated to halt either article $A_{n+1}$ or $A_{n-1}$ in zone $Z_{n+1}$ or $Z_{n-1}$ depending upon the direction of said drive means.

9. The accumulating conveyor of claim 8, wherein n is an integer from 1 to k, where sensor $S_1$ represents the sensor in zone $Z_1$ at one end of the conveyor and sensor $S_k$ represents the sensor in zone $Z_k$ at the other end of the conveyor, and said conveyor further comprises means $OVR_1$ associated with said end for enabling $M_1$ to activate $P_1$ to halt article $A_1$ in zone $Z_1$ when the presence of $A_1$ is sensed by $S_1$ to thereby begin accumulating articles upstream of $Z_1$, and means $OVR_k$ associated with said opposite end for enabling $M_k$ to operate $P_k$ to halt article $A_k$ in zone $Z_k$ when the presence of $A_k$ is sensed by $S_k$ to thereby begin accumulating articles upstream of $Z_k$.

10. The accumulating conveyor of claim 9, wherein $OVR_1$ is further for enabling $M_1$ to deactivate $P_1$ to replace article $A_1$ into engagement with said driving means when at least one article $A_1$ has been accumulated in a direction upstream of $Z_1$ to discharge at least one article $A_1$ from said conveyor towards said end, and said $OVR_k$ is further for enabling $M_k$ to deactivate $P_k$ to replace $A_k$ into engagement with said driving means when at least one article $A_k$ has accumulated in a direction upstream of zone $Z_k$ to discharge at least one article $A_k$ from said conveyor towards said opposite end.

11. The accumulating conveyor of claim 10, wherein each said disengaging means includes an article lifting platform disposed along said path in said zone, said platform being movable from a lowered position below said path to a raised position extending above said path for lifting said article out of engagement with said driving means to halt movement of said article further along said path, said disengaging means further including at least one cam and a corresponding cam follower associated with said platform for lifting said platform from said lowered position to said raised position as said cam revolves about an axis from a first angular displacement to a second angular displacement, and said activating means is responsive to a control signal for revolving said cam from said first to said second orientation.

12. The accumulating conveyor of claim 10, wherein said cam includes a wheel having a shaped edge defining upward displacement H of the platform as a function of an angular displacement $\theta$ of said cam about an axis of rotation.

13. The accumulating conveyor of claim 12, wherein said cam is a uniformly accelerated motion cam.

14. The accumulating conveyor of claim 13, wherein said cam is a plate cam and said follower is substantially limited to rectilinear motion in a vertical direction.

15. The accumulating conveyor of claim 11, further comprising a plurality k of lifting platforms $P_1, \ldots P_n \ldots P_k$ spaced along said path, one said platform $P_n$ being associated with each zone $Z_n$, each said platform $P_n$ having associated therewith at least one cam, each said platform $P_n$ for halting an article $A_n$ being conveyed through said associated zone $Z_n$ from further progress along said path by the corresponding lifting platform being lifted by a control signal directed to the associated activating means for said cam.

16. The accumulating conveyor of claim 11, wherein said cam includes a cam wheel mounted for rotation about axle means aligned transverse to said conveyor path, said cam wheel establishing a cam surface to which the cam follower is held by the downwardly directed weight of said platform, said cam surface being characterized by a constantly increasing radius from a radius $r_o$ for said first angular displacement to a radius $r_1$ for said second angular displacement, wherein $r_1 > r_o$.

17. The accumulating conveyor of claim 16, wherein said path lies substantially in a horizontal plane and each said platform $P_n$ moves substantially in a vertical direction, and said conveyor further comprises means for inhibiting the movement of said platform in a horizontal direction as said platform is being moved in said vertical direction by said cam, said camming surface further imparting no substantial horizontal motion to said platform.

18. The accumulating conveyor of claim 17 comprising at least a pair of cam wheels and an associated pair of cam followers for each platform, each said pair being positioned adjacent each end of said platform, each said cam wheel being mounted on a sprocket driven axle, said conveyor further comprising an endless chain for extending around both sprockets and each said activating means $M_n$ includes means for pulling said chain in response to said control signal to turn said sprocket and cam to lift said platform.

19. The accumulating conveyor of claim 18, wherein each said pulling means comprises a pneumatic cylinder.

20. The accumulating conveyor of claim 19, wherein said pulling means comprises a double-acting pneumatic cylinder and said control signal includes information transmitted pneumatically.

21. Method of controlling the operation of an accumulating conveyor having a plurality of zones between first and second ends of said conveyor, said conveyor having continuously operable drive means extending through said zones for engaging articles on said conveyor to propel articles through said zones along a conveyor path from a generally upstream position towards a generally downstream position, said driving means being operable for propelling articles in either a first direction towards said second end or a second direction towards said first end, each zone including at least one selectively operable means for displacing an article out of engagement with said driving means to thereby halt said article in said zone or replacing a halted article into engagement with said driving means to thereby restart movement of said article, said method comprising the steps of:

(a) operating the displacing means of either endmost zone to cause any article sensed in said zone to be halted;

(b) sensing the presence or absence of articles in each of said zones; and (c) operating the displacing means of each of said zones between said endmost zones to cause any article sensed in said zone to be halted only when either the adjacent zone in either the first or the second direction has an article halted therein, whereby articles are accumulated successively in said zones from either said first end towards said second end or vice versa.

22. The method of claim 21 further including the steps of discharging accumulated articles in either the first or the second direction by (a) operating a selected one of the endmost zones to convey therethrough any article that is sensed therein; and (b) operating the displacing means of each of said zones between said endmost zone to cause any article halted in said zone to be replaced into engagement with said driving means to thereby restart movement of said article.

23. The method of claim 21, further including a displacing step of lifting said articles from engagement with driving means when said articles are to be halted.

24. Apparatus for controlling the operation of an accumulating conveyor having a plurality of zones between first and second ends of said conveyor, said conveyor comprising:

(a) continuously operable drive means extending through said zones for engaging articles on said conveyor to propel articles through said zones along a conveyor path from a generally upstream position towards a generally downstream position, said driving means being operable for propelling articles in either a first direction towards said second end or a second direction towards said first end, (b) at least one selectively operable means associated with each zone for displacing an article out of engagement with said driving means to thereby halt said article in said zone;

(c) means for operating the displacing means of either endmost zone to cause any article sensed in said zone to be halted;

(d) means for sensing the presence or absence of an article in each of said zones;

(e) means for controlling the operation of the displacing means of each of said zones between said endmost zones in a manner to cause any article sensed in said zone to be halted only when either the adjacent zone in either the first or the second direction has an article halted therein.

25. The apparatus of claim 24, wherein said drive means comprises a pair of drive chains spaced adjacent opposing longitudinally directed sides of said conveyor and each said displacing means comprises a lifting frame disposed in said conveyor path between said drive chain pair, said lifting frame for normally lying below the plane of travel of said drive chain pair and being extendable above said plane for lifting an article from engagement with said chains to thereby halt said article on said lifting frame, and said operating means includes means for extending said frame from below said plane to above said plane.

26. The apparatus of claim 25, wherein said controlling means includes a pneumatic circuit having pneumatic elements responsive to said sensing means, said pneumatic circuit for transmitting pneumatic control signals to said operating means.

27. An accumulating conveyor comprising:

(a) a base;

(b) at least one endless conveying means mounted on said base for moving continuously along a path and frictionally engaging an article thereon to continuously convey said article along said path;

(c) at least one article lifting platform disposed along said path and movably mounted on said base, said platform being movable from a lowered position below said path to a raised position extending above said path for lifting an article thereabove out of engagement with said conveying surface to halt movement of said article further along said path;

(d) at least a pair of cam wheels for each platform, one cam wheel of each said pair being positioned adjacent opposing ends of said platform, each said cam wheel being mounted for rotation about a sprocket driven axle aligned transverse to said path, each said sprocket having its own chain, and a corresponding cam follower associated with said platform for each cam wheel for lifting said platform from said lowered position to said raised position as said cam wheel revolves about an axis from a first angular orientation to a second angular orientation, said cam wheel establishing a cam surface to which its corresponding cam follower is held, said cam surface being characterized by a constantly increasing radius from a radius $r_o$ for said first position to a radius $r_1$ for said second position, wherein $r_1 > r_o$, said cam wheel being operatively connected to a pneumatic cylinder through said chains for revolving said cam wheel in response to a control signal including information transmitted pneumatically, said pneumatic cylinder being double-acting for pulling both chains relatively simultaneously in response to said control signal to lift said platform through the action of said pair of cam wheels to halt the progress of an article above said platform; and (e) means for controlling said pneumatic cylinder to properly time the revolving of said cam wheels and the lifting of said platform with the position of said article above said platform.

28. An accumulating conveyor comprising:

(a) a base;

(b) at least one endless conveying means mounted on said base for moving continuously along a path and frictionally engaging an article thereon to continuously convey said article along said path;

(c) a plurality of article lifting platforms disposed along said path and movably mounted on said base, each said platform $P_n$ being movable from a lowered position below said path to a raised position extending above said path for lifting an article thereabove out of engagement with said conveying surface to halt movement of said article further along said path;

(d) at least one uniformly accelerated motion plate cam associated with said base for each platform and a corresponding cam follower associated with said platform, said platform being substantially limited to rectilinear motion in a vertical direction, for lifting said platform from said lowered position to said raised position as said cam revolves about an axis from a first angular orientation to a second angular orientation, said cam having a shaped edge defining upward displacement H of the platform as a function of an angular displacement $\theta$ of said cam about said axis;

(e) means responsive to a control signal for revolving said cam from said first to said second orientation to halt the progress of an article above said platform;

(f) means for controlling said revolving means to properly time the revolving of said cam and the lifting of said platform with the position of said article above said platform;

(g) a plurality of zones $Z_n$ in seriatim, where n is any integer between 1 and k;

(h) a plurality $S_n$ of means for sensing the presence or absence of an article $A_n$ in said associated zone $Z_n$;

(i) a plurality $M_n$ of means responsive to control means for moving platform $P_n$ to said raised position to lift article $A_n$ in zone $Z_n$ from engagement with said conveying means;

(j) control means responsive to $S_n$ and $S_{n+1}$ activate $M_n$ when said $S_n$ has sensed the presence of an article in zone $Z_n$ and $S_{n+1}$ has sensed the presence of article $A_{n+1}$ in zone $Z_{n+1}$ and platform $P_{n+1}$ has been raised to halt article $A_{n+1}$; and (k) means for switching said control means between forward and reverse modes, said reverse mode wherein said control means is responsive to $S_n$ and $S_{n-1}$ to activate $M_n$ when said $S_n$ has sensed the presence of an article in zone $Z_n$ and $S_{n-1}$ has detected the presence of article $A_{n-1}$ in zone $Z_{n-1}$ and platform $P_{n-1}$ has been raised to halt article $A_{n-1}$.

29. An accumulating conveyor comprising:
(a) a base;
(b) at least one endless conveying means mounted on said base for moving continuously along a path and engaging articles thereon to continuously convey said articles along said path;
(c) a plurality of article lifting platforms disposed along said path and movably mounted on said base, said platforms being movable independently from each other from a lowered position below said path to a raised position extending above said path for lifting an article above a selected one of said platforms out of engagement with said conveying surface to halt movement of said article further along said path;
(d) a plurality of cams,
  (1) there being for each platform at least one cam associated with said base and a corresponding cam follower mounted directly to said platform for lifting said platform from said lowered position to said raised position as said cam revolves about an axis from a first angular orientation to a second angular orientation, and
  (2) each of said cams having a shaped edge defining upward displacement H of the platform as a function of an angular displacement $\theta$ of said cam about an axis of rotation;
(e) means for sensing the presence of an article on a selected one of said platforms being moved to a raised position;
(f) means operatively connected to said sensing means and responsive to a control signal from said sensing means for revolving said cam for a platform immediately upstream of said selected platform from said first to said second orientation to halt the progress of an article above said immediately upstream platform; and
(g) means for controlling said revolving means to properly time the revolving of said cam and the lifting of said immediately upstream platform with the position of an article above said immediately upstream platform.

30. The accumulating conveyor of claim 29, wherein said cam is a uniformly accelerated motion cam.

31. The accumulating conveyor of claim 30, wherein said cam is a plate cam and said follower is substantially limited to rectilinear motion in a vertical direction.

32. The accumulating conveyor of claim 31, wherein each said platform has associated therewith at least two cams.

33. The accumulating conveyor of claim 29, wherein said cam includes a cam wheel mounted for rotation about axle means aligned transverse to said conveyor path, said cam wheel establishing a cam surface to which the cam follower is held, said cam surface being characterized by a constantly increasing radius from a radius $r_o$ for said first position to a radius $r_1$ for said second position, wherein $r_1 > r_o$.

34. The accumulating conveyor of claim 33, wherein said path lies substantially in a horizontal plane and said platform moves substantially in a vertical direction, and said conveyor further comprises means for inhibiting the movement of said platform in a horizontal direction as said platform is being moved in said vertical direction by said cam, said camming surface further imparting no substantial horizontal motion to said platform.

35. The accumulating conveyor of claim 34, wherein said inhibiting means comprises at least one guide member mounted on said base, and said platform has a slide member for mating with said guide member.

36. The accumulating conveyor of claim 33, wherein said cam wheel is operatively connected to means for revolving said wheel in response to a control signal.

37. The accumulating conveyor of claim 36, wherein said revolving means comprises a pneumatic cylinder and said control signal includes information transmitted pneumatically.

38. The accumulating conveyor of claim 37, further comprising at least one means for detecting the presence of said article over said platform.

39. The accumulating conveyor of claim 32, comprising a plurality of zones $Z_n$ in seriatim, where n is any integer between 1 and k; a plurality $S_n$ of means for sensing the presence or absence of an article $A_n$ in said associated zone $Z_n$; a plurality $M_n$ of means responsive to control means for moving an associated platform $P_n$ to said raised position to lift article $A_n$ in zone $Z_n$ from engagement with said conveying means; and control means responsive to $S_n$ and $S_{n+1}$ to activate $M_n$ when said $S_n$ has sensed the presence of an article in zone $Z_n$ and $S_{n+1}$ has sensed the presence of article $A_{n+1}$ in zone $Z_{n+1}$ and platform $P_{n+1}$ has been raised to halt article $A_{n+1}$.

* * * * *